(12) United States Patent
Munguia

(10) Patent No.: US 7,243,178 B2
(45) Date of Patent: Jul. 10, 2007

(54) ENABLE/DISABLE CLAIMING OF A DMA REQUEST INTERRUPT

(75) Inventor: Peter R. Munguia, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 464 days.

(21) Appl. No.: 10/439,931

(22) Filed: May 16, 2003

(65) Prior Publication Data

US 2004/0230730 A1    Nov. 18, 2004

(51) Int. Cl.
G06F 12/00 (2006.01)
G06F 13/28 (2006.01)
G06F 13/24 (2006.01)
G06F 13/36 (2006.01)

(52) U.S. Cl. .................. 710/240; 710/22; 710/50; 710/260; 710/266; 711/168

(58) Field of Classification Search ........... 710/22–28, 710/260–269
See application file for complete search history.

(56) References Cited

U.S. PATENT DOCUMENTS

| | | | |
|---|---|---|---|
| 5,063,498 A * | 11/1991 | Hirahara et al. ............. 710/50 |
| 5,497,501 A * | 3/1996 | Kohzono et al. ............. 710/29 |
| 5,619,729 A * | 4/1997 | Bland et al. ................... 710/28 |
| 5,721,828 A * | 2/1998 | Frisch ............................ 709/217 |
| 5,862,387 A * | 1/1999 | Songer et al. ............... 710/240 |
| 6,122,679 A * | 9/2000 | Wunderlich ................... 710/23 |
| 6,125,410 A * | 9/2000 | Salbaum et al. ............... 710/22 |
| 6,151,654 A  | 11/2000 | Poisner et al. |
| 6,163,815 A * | 12/2000 | Fields et al. ................... 710/6 |
| 6,701,405 B1* | 3/2004 | Adusumilli et al. ........ 710/308 |
| 6,738,881 B1* | 5/2004 | Ollivier et al. ............. 711/168 |
| 6,748,486 B2* | 6/2004 | Burton et al. ............... 711/112 |
| 6,859,850 B1* | 2/2005 | MacCormack ............... 710/52 |
| 6,874,039 B2* | 3/2005 | Ganapathy et al. ........... 710/28 |
| 6,889,278 B1* | 5/2005 | Hoerler et al. .............. 710/266 |
| 6,889,279 B2* | 5/2005 | Godfrey ...................... 710/269 |
| 6,922,740 B2* | 7/2005 | Kondratiev et al. .......... 710/22 |
| 7,089,344 B1* | 8/2006 | Rader et al. ................. 710/308 |
| 2002/0161941 A1* | 10/2002 | Chue et al. .................... 710/22 |
| 2004/0019711 A1* | 1/2004 | Bissessur et al. ............. 710/22 |
| 2004/0064648 A1* | 4/2004 | Brown et al. ............... 711/137 |

* cited by examiner

Primary Examiner—Paul R. Myers
Assistant Examiner—Brian Misiura
(74) Attorney, Agent, or Firm—Philip A. Pedigo

(57) ABSTRACT

Machine-readable media, methods, and apparatus are described for performing direct memory access (DMA) transfers. In some embodiments, a device may generate an interrupt to request a DMA transfer. A DMA controller may claim the interrupt and may prevent a processor from receiving and/or servicing the claimed interrupt. The DMA controller may further transfer a data block in response to the claimed interrupt.

10 Claims, 2 Drawing Sheets

ENABLE/DISABLE CLAIMING OF A DMA REQUEST INTERRUPT

BACKGROUND

A computing device may comprise one or more direct memory access (DMA) controllers. A device such as, for example, a network interface controller, a disk controller, a video controller, etc. may request a DMA transfer by generating a DMA request signal on a dedicated DMA request line between the device and the DMA controller. Further, the DMA controller may acknowledge a DMA request by generating a DMA acknowledge signal on a dedicated DMA acknowledge line between the DMA controller and the device. In response to a DMA request, a DMA controller may directly transfer data between a memory and the requesting device.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes direct memory access (DMA) techniques. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
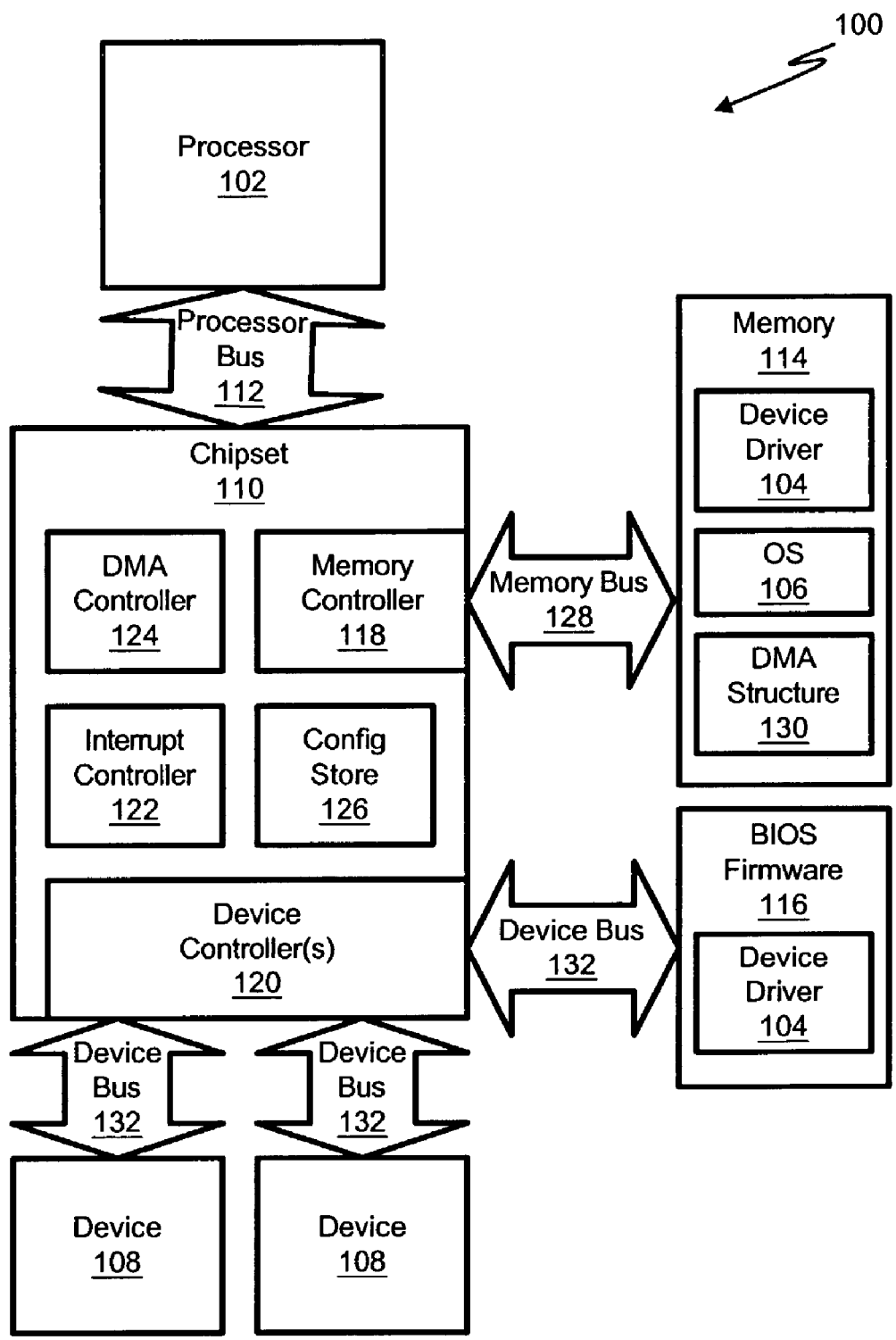
FIG. 1 illustrates an embodiment of a computing device having a DMA controller and an interrupt controller.

An example embodiment of a computing device 100 is shown in FIG. 1. The computing device 100 may comprise one or more processors 102. The processors 102 may perform actions in response to executing instructions. In one embodiment, the processors 102 may execute an interrupt handler such as, for example, a device driver 104 in response to an interrupt. Further, the processors 102 in one embodiment may execute an operating system 106 that controls devices 108, schedule tasks, allocates storage, and provides a user interface.

The computing device 100 may further comprise a chipset 110 that is coupled to the processors via a processor bus 112. The chipset 110 may comprise one or more integrated circuit packages or chips that couple the processors 102 to memory 114, Basic Input/Output System (BIOS) firmware 116 and other devices 108 (e.g. a mouse, keyboard, video controller, hard disk, floppy disk, etc.). To this end, the chipset may comprise a memory controller 118, one or more device controllers 120, an interrupt controller 122, a DMA controller 124, and a configuration store 126.

The memory controller 118 may transfer data to and from the memory 114 via a memory bus 128. The memory 114 may comprise memory devices having addressable storage locations that the memory controller 118 may read data from and/or write data to. The memory 114 may comprise one or more different types of memory devices such as, for example, dynamic random access memory (DRAM) devices, synchronous dynamic random access memory (SDRAM) devices, double data rate (DDR) SDRAM devices, quad data rate (QDR) SDRAM devices, or other volatile or non-volatile memory devices. Moreover, the memory 114 may comprise routines or drivers 104 which the computing device 100 may execute to communicate with one or more components of the computing device 100. The memory 114 may also comprise direct memory access (DMA) descriptor blocks, DMA descriptor chains, and/or other DMA structures 130 to identify data to be transferred by the DMA controller 124.

The chipset 110 may further control and transfer data with the other devices 108 that are coupled to the device controllers 120 via various device buses 132. For example, the chipset 110 may comprise peripheral component interconnect (PCI) controllers, accelerated graphics port (AGP) controllers, universal serial bus (USB) controllers, low pin count (LPC) bus controllers, and/or other input and/or output (I/O) controllers to control and transfer data with devices 108 via respective device buses 132.

In one embodiment, the BIOS firmware 116 may comprise routines which the computing device 100 may execute during system startup in order to initialize the processors 102, chipset 110, and other components of the computing device 100. Moreover, the BIOS firmware 116 may comprise routines or drivers 104 which the computing device 100 may execute to communicate with one or more components of the computing device 100.

The device driver 104 may control operation of a device 108 and may control flow of data to and/or from the device 108. In particular, the device driver 104 may store in the memory 114 DMA structures 130 such as, for example, DMA descriptor blocks and/or DMA descriptor chains that identify data to be transferred by the DMA controller 124. The device driver 104 may further inform the DMA controller 124 of the location of the DMA structure 130, and may request the DMA controller 124 to transfer data as indicated by the identified DMA structure 130.

In one embodiment, the device driver 104 may construct DMA structures 130 that comprise one or more source locations, one or more destination locations, one or more transfer lengths, and one or more control words. To support more than one type of DMA structure 130, the device driver 104 may use the control word to inform the DMA controller 124 as to the format of the DMA structure 130. For example, the control word may indicate whether the transfer length is a byte, a word, a cache line, a memory line, or a page length.

The DMA controller 124 may transfer data from the memory 114 to a device 108 and/or from a device 108 to the memory 114. In one embodiment, the DMA controller 124 may transfer data based upon a DMA structure 130 stored in the memory 114. In another embodiment, the DMA controller 124 may be hardwired to simply transfer a data block from a predetermined source location to a predetermined destination location. In yet another embodiment, a source location, destination location, and/or transfer length for the DMA controller 124 may be programmed via the DMA structure 130 and/or the configuration store 126. Moreover, the DMA controller 124 may claim a DMA request interrupt and may prevent the claimed DMA request interrupt from being delivered to or serviced by the processor 102. In one embodiment, the DMA controller 124 may claim a DMA request interrupt in response to the configuration store 126 indicating that DMA claiming for the DMA request interrupt has been enabled. The DMA controller 124 may deliver one or more claimed DMA claimed interrupts to the processors 102 in response to completing a DMA transfer. In one embodiment, the DMA controller 124 may deliver one or more claimed interrupts based upon whether the configuration store 126 indicates such interrupts are to be delivered.

The configuration store 126 may control the operation of and may report the status of the DMA controller 124, interrupt controller 122, memory controller 118, device controllers 120 and/or other circuits of the chipset 110. To this end, the configuration store 126 in one embodiment may comprise one or more registers, latches, and/or other storage mechanisms that store control bits, control words, status bits, status words, and/or other information for the chipset 110. In one embodiment, the configuration store 126 may indicate which interrupts are DMA request interrupts. For example, the computing device 100 may indicate via the configuration store 126 that interrupts associated with one or more interrupt numbers (e.g. INT 3) are DMA request interrupts. Similarly, the configuration store 126 may indicate that interrupts having one or more interrupt vectors are DMA request interrupts. The configurations store 126 in one embodiment may further enable and disable DMA claiming for each defined DMA request interrupt. The configuration store 126 may also indicate whether one or more claimed interrupts are to be delivered to the processors 102 in response the DMA transfer associated with the claimed DMA request interrupts being completed.

The interrupt controller 122 may receive interrupts from devices 108, may arbitrate among the pending interrupts, and may deliver a pending interrupt to one or more processors 102. The computing device 100 may support one or more different techniques for a device 108 to inform the interrupt controller 122 that an interrupt has occurred. For example, a device 108 may activate an interrupt terminal of the interrupt controller 122 that is associated with an interrupt number in order to inform the interrupt controller 122 that an interrupt having the associated interrupt number has occurred. Similarly, a device 108 may activate a PCI interrupt line which has been routed to an interrupt terminal of the interrupt controller 122 to inform the interrupt controller 122 that an interrupt having the associated interrupt number has occurred. A device 108 may also transmit an interrupt message comprising an interrupt number via a serial interrupt line SERIRQ in order to inform the interrupt controller 122 that an interrupt having the interrupt number of the interrupt message has occurred. Another technique a device 108 may use to signal an interrupt is to write a message that comprises an interrupt number to an interrupt register of the configuration store 126, thus informing the interrupt controller 122 that an interrupt having the interrupt number has occurred.

The computing device 100 may further support one or more different techniques for delivering interrupts to one or more of the processors 102. For example, the interrupt controller 122 may activate an interrupt line that is connected to an INTR terminal of a processor 102. The processor 102 may in-turn acknowledge the interrupt to obtain an interrupt vector from interrupt controller 122 that identifies an interrupt handler (e.g. device driver 104) to be executed. The interrupt controller 122 may also transmit an interrupt message on a serial interrupt line SERIRQ that is connected to a SERIRQ terminal of the processor 102. Similarly, the interrupt controller 122 may transmit an interrupt message on an interrupt bus (e.g. a 3-wire serial bus) that is connected to interrupt bus terminals of the processors 102. The interrupt controller 122 may further deliver an interrupt message to one or more processors 102 by transmitting an interrupt message on the processor bus 112. In one embodiment, the interrupt controller 122 may transmit the interrupt message on the processor bus 112 by writing to a predetermined address that the processors 102 associate with interrupt messages and providing the contents of the interrupt message (e.g. interrupt vector, delivery mode, destination mode, etc.) during one or more data phases of the write.

Moreover, the interrupt controller 122 may deliver DMA request interrupts to the DMA controller 124 instead of the processor 102 based upon the configuration store 126 and/or signals of the DMA controller 124. In one embodiment, the interrupt controller 122 may deliver the DMA request interrupt to the DMA controller 124 and may not inform the processors 102 of the DMA request interrupt in response to the configuration store 126 indicating the DMA claiming for the DMA request interrupt is enabled.

Figure 2:
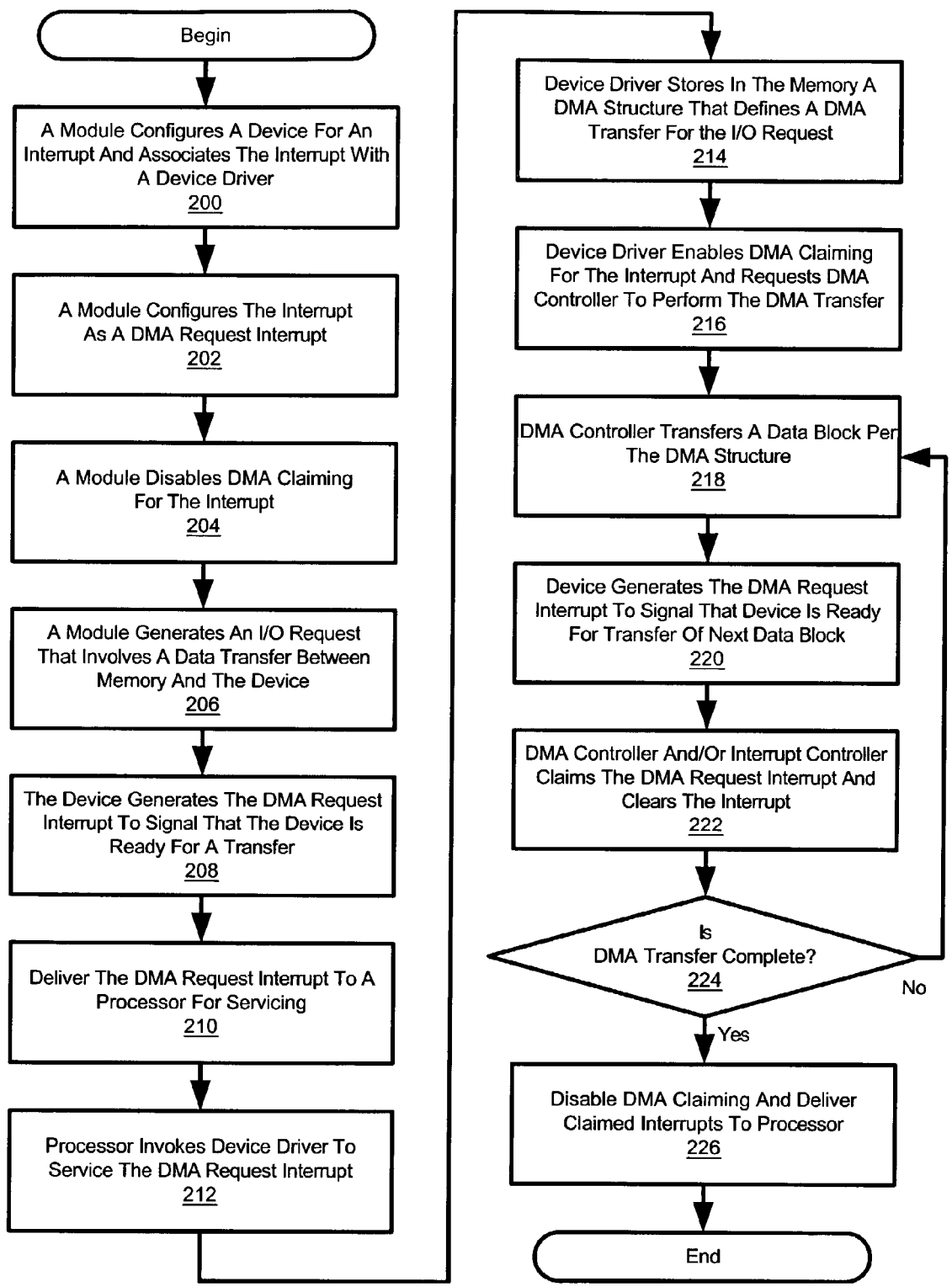
FIG. 2 illustrates an embodiment of DMA transfer method that may be implemented by the computing device of FIG. 1.

Referring now to FIG. 2, an embodiment of a DMA transfer method is depicted. In block 200, a device driver 104, BIOS 116, operating system 106 and/or some other module of the computing device 100 may configure a device 108 for a particular interrupt (e.g. INT 3) and may program the interrupt controller 122 with an interrupt vector that identifies the device driver 104 for the device 108. The device driver 104, BIOS 116, operating system 106 and/or some other module in block 202 may configure the interrupt as a DMA request interrupt. In block 204, the device driver 104, BIOS 116, operating system 106, and/or some other module may further disable DMA claiming for the DMA request interrupt. In one embodiment, the device driver 104, BIOS 116, operating system 106 and/or some other module may update the configuration store 126 to configure the interrupt as a DMA request interrupt and to disable DMA claiming for the DMA request interrupt.

In block 206, an application, a service, the operating system 106, or some other module may generate an I/O request that involves a dat transfer between the memory 114 and the device 108. In response to the I/O request, the device driver 104 may configure the device 108 for the transfer. In one embodiment, the device driver 104 may update one or more registers of the device 108 in order to configure the device 108 for the transfer.

The device 108 in block 208 may indicate that the device 108 is ready for a data transfer by generating a DMA request interrupt using one of the interrupt generation techniques described previously. In another embodiment, the device 108 may update a status register causing a status terminal of the device 108 to change state. The status terminal may be coupled to an interrupt terminal of the interrupt controller 122. The interrupt controller 122 may interpret the change in the status terminal as a DMA request interrupt.

In block 210, the DMA controller 124 and/or interrupt controller 122 may permit delivery of the DMA request interrupt to one or more processors 102 since the configuration store 126 indicates that DMA claiming is disabled for the DMA request interrupt. The processors 102 in block 212 may service the DMA request interrupt. In one embodiment, the processors 102 may service the interrupt by invoking execution of the device driver 104 identified by an interrupt vector for the DMA request interrupt.

The device driver 104 may generate and store a DMA structure 130 in the memory 114 that defines a data transfer to satisfy all or a portion of the I/O request (block 214). The device driver 104 may further configure the DMA controller 124 to perform the data transfer defined by the DMA structure 130. In one embodiment, the device driver 104 may update one or more registers of the DMA controller 124 with the location of the DMA structure 130 and/or other parameters which configure the DMA controller for the transfer. The device driver 104 may further enable DMA claiming in block 216 by updating the configuration store 126 accordingly. The device driver 104 may then request the DMA controller 124 to begin the transfer.

The DMA controller 124 in block 218 may transfer a data block (e.g. a byte, a word, a cache line, etc.) between the device 108 and the memory 114 according to the DMA structure 130. In one embodiment, the DMA controller 124 may clear the claimed interrupt by generating an end of interrupt (EOI) message, an interrupt acknowledge message, updating one or more registers of the interrupt controller 122, and/or some other operation. In response to completing the transfer of the data block, the device 108 in block 220 may generate an interrupt to inform the DMA controller that the device 108 is ready to participate in the transfer of the next data block. Again, the device 108 may generate such an interrupt using any of the techniques described above.

In response to the interrupt, the DMA controller 124 and/or interrupt controller 122 in block 222 may claim the interrupt and prevent delivery of the interrupt to the processors 102 since the configuration store 126 indicates that DMA claiming is enabled for the DMA request interrupt. The DMA controller 124 in block 224 may determine based upon the DMA structure 130 whether the DMA transfer defined by the DMA structure 130 has been completed. In response to determining that additional data blocks are to be transferred, the DMA controller 124 may return to block 218 in order to transfer the next data block as indicated by the DMA structure 130. Otherwise, the DMA controller 124 in block 226 may disable DMA claiming for the DMA request interrupt so that the device driver 104 may service future DMA request interrupts. Further, the DMA controller 124 in one embodiment may deliver one or more of the interrupts that were previously claimed. In such embodiments, delivery of the claimed interrupts may enable the device driver 104 and/or other interrupt handlers to perform clean-up or other operations associated with the transfer.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A machine-readable storage medium comprising a plurality of instructions that, in response to being executed by a computing device, results in the computing device
   defining an interrupt as a DMA request interrupt,
   causing a device to generate the interrupt each time the device is ready for a transfer of a data block,
   storing a DMA structure in a memory that defines a DMA transfer between the memory and the device in response to the first generation of the interrupt,
   enabling claiming of the interrupt by a chipset to prevent delivery of further generations of the interrupt to a processor of the computing device, and
   configuring the chipset to transfer a data block per the DMA structure each time the device generates the interrupt.

2. The machine-readable storage medium of claim 1 wherein the plurality of instructions further result in the computing device configuring the chipset to deliver at least one of the claimed interrupts to the processor after the DMA transfer.

3. The machine-readable storage medium of claim 1 wherein the plurality of instructions further result in the computing device defining the interrupt as a DMA request interrupt based upon a interrupt number associated with the interrupt.

4. The machine-readable storage medium of claim 1 wherein the plurality of instructions further result in the computing device defining the interrupt as a DMA request interrupt based upon a interrupt vector associated with the interrupt.

5. The machine-readable storage medium of claim 1 wherein the plurality of instructions further result in the computing device disabling claiming of the interrupt by the chipset after completing the DMA transfer defined by the DMA structure.

6. A method comprising:
   defining an interrupt as a DMA request interrupt,
   causing a device to generate the interrupt each time the device is ready for a transfer of a data block, storing a DMA structure in a memory that defines a DMA transfer between the memory and the device in response to the first generation of the interrupt, enabling claiming of the interrupt by a chipset to prevent delivery of further generations of the interrupt to a processor of the computing device, and configuring the chipset to transfer a data block per the DMA structure each time the device generates the interrupt.

7. The method of claim 6, further comprising:

configuring the chipset to deliver at least one of the claimed interrupts to the processor after the DMA transfer.

8. The method of claim 6, further comprising:

defining the interrupt as a DMA request interrupt based upon a interrupt number associated with the interrupt.

9. The method of claim 6, further comprising:

defining the interrupt as a DMA request interrupt based upon a interrupt vector associated with the interrupt.

10. The method of claim 6, further comprising:

disabling claiming of the interrupt by the chipset after completing the DMA transfer defined by the DMA structure.

* * * * *